Feb. 17, 1970   E. A. MUIJDERMAN   3,495,885
HYDRODYNAMIC SLIDING BEARING
Filed March 5, 1968
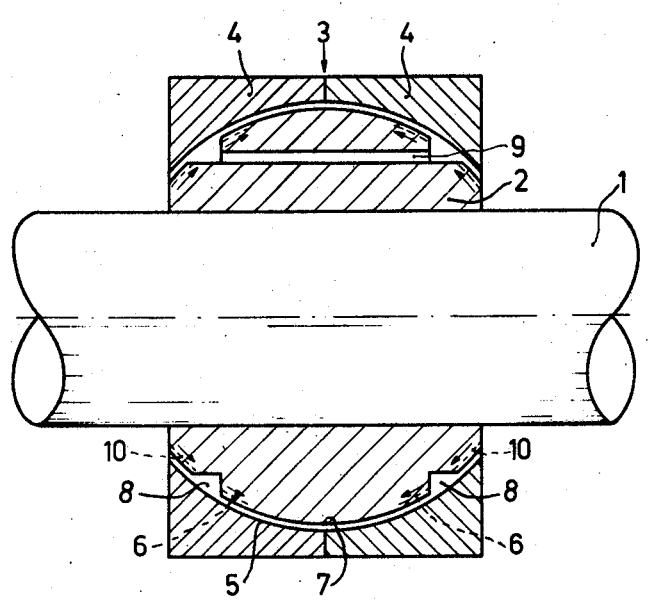
INVENTOR
EVERHARDUS A. MUIJDERMAN
BY
AGENT

United States Patent Office 3,495,885
Patented Feb. 17, 1970

3,495,885
HYDRODYNAMIC SLIDING BEARING
Everhardus Albertus Muijderman, Emmasingel, Eindhoven, Netherlands, assignor, by mesne assignments, to U.S. Philips Corporation, New York, N.Y., a corporation of Delaware
Filed Mar. 5, 1968, Ser. No. 710,515
Claims priority, application Netherlands, Mar. 31, 1967, 6704589
Int. Cl. F16c 29/02, 17/16
U.S. Cl. 308—121                    5 Claims

ABSTRACT OF THE DISCLOSURE

A hydrodynamic sliding bearing assembly for supporting a shaft at any point along its length and having a partially spherical bearing attached to said shaft and seated in a complementary outer concave bearing. The confronting bearing surfaces contain interconnected lubricant storage chambers and annular grooves for providing lubrication to the confronting surfaces of the two bearings.

---

The invention relates to a hydrodynamic sliding bearing assembly for a continuous shaft in which a partially spherical bearing secured to the shaft fits into a cavity formed in another second bearing bounded at least partially by a concave surface. The first bearing is movable around the common centre of the confronting surfaces of the said two bearings which centre is located near the centre line of the shaft.

Previously known hydrodynamic sliding bearings of the so-called self-adjusting type use a hydrodynamically active lubricant, such as oil, between the bearing cooperating with the shaft and the shaft itself. In another known construction, a further cylindrical bearing is secured to the shaft. These bearings comprise two groups of surfaces cooperating with each other to obtain the desired degree of movement, and consequently the spherical surfaces and the actual bearing surfaces have to be machined with the high degree of accuracy.

The invention provides for an improved construction of a sliding bearing of this type. According to the present invention, the sliding bearing is characterized in that at least during its operation, the hydrodynamically active quantity of lubricant of the bearing is arranged between one concave bearing and another partially spherical bearing the latter spherical bearing being rigidly secured to the shaft and movable in said concave bearing. The spherical and/or concave surface of at least one of the two bearings being provided with an annular pattern of approximately loxodromic, shallow lubricant urging grooves.

The bearing according to the invention has both the hydrodynamic and the self-adjusting properties which is obtained by the cooperation of the spherical and concave adjoining surfaces. This is further made possible by maintaining the hydrodynamic pressure build-up in the lubricant by means of the said pattern of urging grooves. The urging effect of such a pattern is based on the shape of the shallow grooves, actually said shape is such that their centre lines are approximately loxodromic. In such a pattern arranged on a spherical surface this means that the lines of contact in all points of such centre line enclose substantially the same angle with the relative velocity vector of the two parts of the bearing. With such a pattern of urging grooves a bearing can be obtained which has a large radial load-carrying capacity and low frictional loss. In connection with the shape of the cooperating surfaces of the parts of the bearing, the bearing also has a certain axial load-carrying capacity. There is no restriction in the choice of the lubricant. Usually oil or grease will be chosen but, for example, water, graphite, and the like are also suitable.

The bearing according to the invention may be used both in rotating shafts, having a stationary outer concave bearing, and in stationary shafts with rotating outer bearings. The pattern of urging grooves can be placed on either of the two bearings.

A pattern of urging grooves may cover the whole spherical or concave surface of the bearing of one of the two bearings, in that case the surface of the other part of the bearing cooperating with said surface will be entirely smooth. Alternatively, the two cooperating surfaces may be smooth over a large part of their length measured in the axial direction, a short pattern of urging grooves being always arranged on at least one of the parts of the bearing beside the smooth surface. It is also possible that one part of the bearing or both parts of the bearing can have a cavity near the urging side of a pattern of urging grooves, which cavity will contribute to the load-carrying capacity of the bearing, as a result of the pressure of the lubricant urged therein by the pattern.

The bearing according to the invention may be constructed so that substantially no replenishing of the supply of lubricant is necessary. This is achieved by returning lubricant which has leaked away or has been conducted away to the entrance side of the pattern of urging grooves. An advantageous embodiment of the bearing has the bearing secured to and rotating with the rotating shaft and has near the entrance side of a pattern of urging grooves, an annular storage chamber bounded by the other stationary outer concave bearing, which chamber communicates, through a return duct located in one of the two bearings, with a part of the surface of said bearing which, viewed from said chamber, is situated beyond said pattern. This return duct may be a groove in one of the surfaces of the bearing, but may alternatively be an aperture in one of the bearings. As a result of the said position and shape of the storage chamber during rotation of the shaft the centrifugal force will supply the lubricant to the area at the entrance side of the pattern of urging grooves. It will also insure that, there will therefore always be sufficient amount of lubricant present at said entrance side of the grooves.

A plurality of patterns of urging grooves may be used in the bearing. An embodiment of the bearing according to the invention which is favourable in this respect comprises two patterns of urging grooves which face each other with the urging sides, the part of the bearing co-rotating with the shaft comprising an annular storage chamber near the entrance side of each of the said patterns. In addition, at least one of the two bearings may have an aperture through which the two storage chambers communicate with each other. It is possible that in this bearing the said two patterns of urging grooves adjoin each other directly with their urging sides but usually a sufficient urging effect and a full-lubricated bearing can be obtained with two comparatively short patterns of urging grooves between which the spherical surfaces of the two parts of the bearing are smooth. Alternatively, both parts of the bearing, or either of the parts, may comprise a cavity which is situated between the two patterns of urging grooves. The two patterns may have the same urging force but, alternatively, they may be constructed in such manner that there is a difference in urging force. As a result of this a significant circulation of the lubricant can be obtained.

Furthermore, according to the invention it is possible in a comparatively simple manner to fully avoid the loss of lubricant by leakage. An embodiment of the bearing according to the invention has in at least one of the two bearings, near the side of a storage chamber remote from a pattern of urging grooves, an annular pattern of approximately loxodromic shallow urging grooves which faces said chamber with its urging side. Such a pattern has an excellent sealing effect.

In order that the invention may be readily carried into effect, one embodiment thereof will now be described in greater detail, by way of example, with reference to the accompanying diagrammatic drawing, the sole figure of which diagrammatically shows a cross-section of the bearing according to the invention.

The bearing arranged on the shaft 1 comprises a bearing 2 rigidly secured to the shaft by conventional means not shown and an outer bearing 3 which may be constructed of two halves 4. At its outer circumference the bearing 2 is mainly spherical and fits in the cavity of the bearing 3 bounded by a concave surface 5.

Two annular groove patterns 6 for urging lubricant, (diagrammatically shown by the broken line) are provided in the spherical susface of bearing 2 with their direction of urging facing each other as denoted by an arrow. Between the patterns 6 the surface 7 of the bearing 2 is also spherical but smooth. An annular storage chamber 8 is located on either side of the pattern of grooves 6.

The lubricant (not shown for clarity) in a storage chamber 8, for example, grease or oil, is forced against the surface 5 by the centrifugal force of the rotating shaft 1 and as a result of this comes within reach of the entrance side of the patterns of grooves 6. The latter transport the lubricant between said patterns themselves and the surface 5 of the space between the spherical surfaces 5 and 7. As a result of this they provide a hydrodynamic effect so that the bearing has a large radial and also a certain axial load-carrying capacity with low frictional loss.

In the embodiment shown of the bearing according to the invention the storage chambers 8 communicate with each other through an aperture 9 in the bearing part 2. As a result of this circulation of the lubricant is possible and will arise, for example, when the patterns of grooves 6, are of a different length and/or different pitch angle so that their urging force is different.

The surfaces 5 and 7 between the patterns 6 may be locally interrupted, if desired, by cavities in the bearings 2 or 3.

On the side of the storage chambers 8 remote from the entrance side of the patterns 6, patterns of grooves 10 for urging lubricant are provided. They have a sealing effect as a result of which loss of lubricant due to leakage can substantially entirely be avoided.

When a thin-liquid lubricant is used (for example, water or thin oil) it is desirable to provide the pattern of grooves 10 in such manner that their entrance side is located at some distance from the extreme edge of the cooperating surfaces. In this case, leakage away of such a thin lubricant is avoided as much as possible, also when the bearing is stationary.

The drawing shows only one example, and above only a few examples of the bearing according to the invention have been described. It is obvious that many variations of the present self-adjusting hydrodynamic sliding bearing according to the invention are possible.

What is claimed is:

1. A hydrodynamic sliding bearing assembly having a shaft comprising a first bearing having a partially spherical surface and rigidly secured to the shaft between the ends thereof, a second bearing having a concave surface confronting the spherical surface and accommodating the first bearing, the first bearing being movable about the common center of the confronting curved surfaces, at least one of the confronting curved surfaces defining therein a first annular pattern of grooves for urging a lubricant between said confronting surfaces, and at least one annular storage chamber for said lubricant, formed in one of the bearings.

2. A hydrodynamic sliding bearing assembly as claimed in claim 1, wherein a second annular groove pattern is provided radially beyond the first annular groove pattern for sealing the lubricant within the assembly.

3. A hydrodynamic sliding bearing assembly as claimed in claim 2, wherein there are at least two annular storage chambers and said chambers are interconnected to permit circulation of the lubricant.

4. A hydrodynamic sliding bearing assembly as claimed in claim 3, wherein at least two first annular groove patterns are provided adjacent the annular storage chambers, said chambers thereby supplying lubricant for the grooves.

5. A hydrodynamic sliding bearing assembly as claimed in claim 4, wherein the groove patterns follow a loxodromic curve for large radial load-carrying capacity and low frictional loss.

References Cited

UNITED STATES PATENTS

| 3,207,563 | 9/1965 | Muijderman | 308—172 |
| 3,302,048 | 7/1967 | Gray | 308—9 |

MARTIN P. SCHWADRON, Primary Examiner

F. SUSKO, Assistant Examiner